US007076519B1

(12) United States Patent
Satou

(10) Patent No.: US 7,076,519 B1
(45) Date of Patent: Jul. 11, 2006

(54) SERVER-CLIENT TYPE SYSTEM AND DATA DOWNLOADING METHOD

(75) Inventor: Masaaki Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 619 days.

(21) Appl. No.: 09/656,714

(22) Filed: Sep. 7, 2000

(30) Foreign Application Priority Data

Sep. 14, 1999  (JP)  ................... 11-259979

(51) Int. Cl.
G06F 15/16 (2006.01)
G06F 15/173 (2006.01)

(52) U.S. Cl. .................. 709/203; 709/218; 709/219; 709/227; 709/228; 709/229; 709/231; 709/232; 709/235; 709/244

(58) Field of Classification Search ................ 455/4.2; 705/45; 395/200; 709/203, 208, 209, 216–219, 709/223–235, 238, 239, 244, 248
See application file for complete search history.

(56) References Cited

U.S. PATENT DOCUMENTS

| 5,268,904 | A | * | 12/1993 | Umeda ..................... 370/251 |
| 5,272,697 | A | * | 12/1993 | Fraser et al. ............... 370/235 |
| 5,289,472 | A | * | 2/1994 | Cho ......................... 370/467 |
| 5,594,867 | A | * | 1/1997 | Yoshida |
| 5,598,406 | A | * | 1/1997 | Albrecht et al. ............ 370/296 |
| 5,615,213 | A | * | 3/1997 | Griefer ..................... 370/412 |
| 5,692,130 | A | * | 11/1997 | Shobu et al. |
| 5,701,465 | A | * | 12/1997 | Baugher et al. ............ 707/10 |
| 5,745,758 | A | * | 4/1998 | Shaw et al. ................ 718/102 |
| 5,761,429 | A | * | 6/1998 | Thompson ................ 709/224 |
| 5,898,668 | A | * | 4/1999 | Shaffer ..................... 370/230 |
| 5,909,673 | A | * | 6/1999 | Gregory |

(Continued)

FOREIGN PATENT DOCUMENTS

EP           355777 A2 *   2/1990

(Continued)

OTHER PUBLICATIONS

Kessler, Gary C. and Southwick, Peter V. "ISDN: Concepts, Facilities, and Services," McGraw Hill, 1998, pp. 125-127, 148, 149, 151, and 219.*

(Continued)

*Primary Examiner*—Jason Cardone
*Assistant Examiner*—Melvin H. Pollack
(74) *Attorney, Agent, or Firm*—Sughrue Mion, PLLC

(57) ABSTRACT

In a server-client type system, when a large volume of data to be transmitted whose volume is not less than a predetermined value is generated, a server notifies to a terminal device as a transmission destination to the effect that the large volume of data is to be transmitted by the D-channel packet exchange, and after receiving a data transmission timing signal from the terminal device, starts transmission of the large volume of data using a B-channel to cause the terminal device to download the large volume of data, and the terminal device monitors a state of a free B-channel line in all ISDN communication devices on the client side connected to the same digital service unit upon receiving the notification of transmission of the large volume of data from the server and notifies the server of the data transmission timing signal by the D-channel packet exchange at timing not preventing use of a B-channel line.

7 Claims, 9 Drawing Sheets

U.S. PATENT DOCUMENTS

| | | | |
|---|---|---|---|
| 5,966,636 A * | 10/1999 | Corrigan et al. | |
| 5,991,293 A * | 11/1999 | Buchanan et al. | 370/353 |
| 6,032,189 A * | 2/2000 | Jinzenji et al. | 709/235 |
| 6,075,846 A * | 6/2000 | Jenneve et al. | 379/93.24 |
| 6,097,700 A * | 8/2000 | Thornberg et al. | 370/233 |
| 6,101,535 A * | 8/2000 | Hussmann et al. | 709/217 |
| 6,104,727 A * | 8/2000 | Moura et al. | 370/468 |
| 6,205,144 B1 * | 3/2001 | Mohrmann | 370/395.64 |
| 6,298,372 B1 * | 10/2001 | Yoshikawa | 709/200 |
| 6,307,836 B1 * | 10/2001 | Jones et al. | 370/230 |
| 6,349,297 B1 * | 2/2002 | Shaw et al. | 707/4 |
| 6,360,271 B1 * | 3/2002 | Schuster et al. | 709/231 |
| 6,415,373 B1 * | 7/2002 | Peters et al. | 711/167 |
| 6,674,713 B1 * | 1/2004 | Berg et al. | 370/217 |
| 6,862,264 B1 * | 3/2005 | Moura et al. | 370/229 |
| 6,904,053 B1 * | 6/2005 | Berman | 370/466 |

FOREIGN PATENT DOCUMENTS

| | | | |
|---|---|---|---|
| EP | 497000 A2 * | 8/1992 | |
| EP | 848560 A2 * | 6/1998 | |
| EP | 880259 A2 * | 11/1998 | |
| EP | 719044 B1 * | 7/1999 | |
| JP | 4-120843 | 4/1992 | |
| JP | 05344251 A * | 12/1993 | |
| WO | WO 9851115 A2 * | 11/1998 | |

OTHER PUBLICATIONS

Yamanaka, Naoaki et al. "ALPEN: An ATM Multi-Protocol Emulation Network Based on Periodical Performance Checks Between Edge Nodes," Electronics and Communications in Japan, Part 1, vol. 81, Issue 8, pp. 19-31.*

* cited by examiner

SERVER-CLIENT TYPE SYSTEM AND DATA DOWNLOADING METHOD

BACKGROUND OF THE INVENTION

1. Field of the Invention

The present invention relates to a server-client type system and a data downloading method and, more particularly, to a server-client type system using ISDN lines and a data downloading method using ISDN lines.

2. Description of the Related Art

In a server-client type system in which a terminal adapter (TA) at a user home connected to a telephone, a facsimile device (hereinafter referred to as FAX), a personal computer (hereinafter referred to as PC), etc. is connected to a server through a first digital service unit (DSU), an Integrated Service Digital Network (ISDN) and a second DSU, at the time of downloading data existing in a client's terminal at the user home from the server, it is a conventional practice to start data downloading immediately at that time. On this occasion, the D-channel (Dch) packet exchange will serve for the downloading of a small volume of data (not more than several tens k bytes), while the same will take much time for the downloading of a large volume of data (several M bytes for program data etc. in general).

Under these circumstances, the data downloading method using Bch is conventionally known (Japanese Patent Laying-Open (Kokai) No. Heisei 4-120843). In the conventional data downloading method, a terminal device in advance downloads data to be downloaded into a line control device, while the line control device downloads the downloaded data into an apparatus accommodated in the ISDN network through Bch, thereby realizing data downloading through Bch having a high transmission rate independently of a transmission rate of a standard interface to reduce a downloading time.

For reference, time and charges for transmitting 4 M-byte data (4096 k bytes) within a relevant area are as follows. First, in a case of the Dch packet exchange, a transmission rate of Dch is 16 (k bytes/sec) and a transmission time of 4 M-byte transmission data will be accordingly 256 seconds (=4096 (k bytes)÷16 (k bytes/sec)). However, in a case of a packet, taking a header attached to each packet, and accumulation at an exchange and a transfer time into consideration, the transmission time will be approximately one and a half the above transmission time, that is, 384 seconds.

As to communication charges incurred in the Dch packet exchange, assuming that it costs 0.8 yen per packet and that transmission is conducted with one packet of 256 octets (0.25 k bytes), 4 M-byte transmission data is equivalent to 16384 packets (=4096 (k bytes)÷0.25 (k octets)) to charge 13107.2 (yen) (=16384 (packets)×0.8 (yen/packet).

In a case of the Bch packet exchange, a transmission rate of Bch is 64 (k bytes/sec), so that a transmission time of the 4 M-byte transmission data is 64 (sec) (=4096 (k bytes)÷64 (k bytes/sec)). However, since in a case of a packet, the transmission time will be approximately one and a half the above transmission time, that is, 96 seconds taking a header attached to each packet, and accumulation at an exchange and a transfer time into consideration.

As to communication charges incurred in the Bch packet exchange, assuming that it costs 6.2 yen per packet and that transmission is conducted with one packet of 4096 octets (4 k bytes), 4 M-byte transmission data is equivalent to 1024 packets (=4096 (k bytes)÷4 (k octets)) to charge 6348.8 yen (=1024 (packets)×6.2 (yen/packets)).

In a case of the Bch line exchange, a transmission time of the 4 M-byte transmission data is 64 (sec) (=4096 (k bytes)÷64 (k bytes/sec)) and its charge will be 10 yen within three minutes in the area. Calculation on the above transmission of data of 4 M-byte size will be summarized as follows.

TABLE 1

| THE KIND OF LINE | TIME(sec) | CHARGES(yen) |
|---|---|---|
| Dch packet exchange | 384 | 13107 |
| Bch packet exchange | 96 | 6348 |
| Bch line exchange | 64 | 10 |

As can been seen from the above Table 1, as to transmission of a large volume of data (of several M bytes), using the Bch line exchange taking charges and time into consideration is most preferable.

In the above-described conventional data downloading method, however, since the calculation results in the above Table 1 are obtained in a case where a transfer efficiency is 100 percent and there is no error, lines are occupied at least for 64 seconds, and at this time if other equipment at the user home is in use using the remaining Bch, which means that both of the two Bch lines are in use, even when the telephone should be used in emergency, it is necessary to wait for either line to be freed, which prevents efficient line use and sharing.

SUMMARY OF THE INVENTION

An object of the present invention is to provide a server-client type system and a data downloading method enabling efficient line use and sharing.

According to the first aspect of the invention, a server-client type system in which a terminal device on a client side is connected to a server through an ISDN network and corresponding one or at least two digital service units, wherein the server comprises notification means for notifying, when a large volume of data to be transmitted whose volume is not less than a predetermined value is generated, to the terminal device as a transmission destination to the effect that the large volume of data is to be transmitted by the D-channel packet exchange, and transmission means for, after the reception of a data transmission timing signal from the terminal device, starting transmission of the large volume of data using a B-channel to cause the terminal device to download the large volume of data, and the terminal device comprises monitoring means for monitoring a state of a free B-channel line of all ISDN communication devices on the client side connected to the digital service unit to which the terminal device in question is connected upon receiving the notification of transmission of the large volume of data from the server, and transmission allowance notifying means for notifying the server of the data transmission timing signal by the D-channel packet exchange at timing not preventing use of a B-channel line with the help of the monitoring means.

According to the present invention, since a data transmission timing signal is notified to a server by the Dch packet exchange at timing not preventing use of Bch lines at a terminal device and when receiving the data transmission timing signal, the server transmits data to the terminal device for downloading, downloading taking user's line use into consideration first of all is possible.

In the preferred construction, the terminal device comprises time zone determination means for determining, upon receiving the notification of transmission of the large volume of data from the server, whether the reception time is within a B-channel use-allowed time zone or not and when within the B-channel use-allowed time zone, transmitting the data transmission timing signal to the server.

In another preferred construction, the terminal device if the time when the notification of transmission of the large volume of data is received from the server is within a B-channel use-allowed time zone, upon a lapse of a first predetermined time with the B-channels of all the ISDN communication devices connected to the digital service unit to which the terminal device in question is connected being all free, notifies the server of a transmission allowance to cause the server to transmit the large volume of data, and if the time when the notification of transmission of the large volume of data is received from the server is not within the B-channel use-allowed time zone and at that time, a part of the B-channels of all the ISDN communication devices connected to the digital service unit to which the terminal device in question is connected are free, notifies the server of a transmission non-allowance to cause the server receiving the transmission non-allowance to again notify the terminal device to the effect that the large volume of data is to be transmitted by the D-channel packet exchange upon a lapse of a second predetermined time.

In another preferred construction, the terminal device conducts calling to the server for downloading in place of the transmission allowance notification.

In another preferred construction, the terminal device conducts calling to the server for downloading, if there is at least one free B-channel line among all the ISDN communication devices connected to the digital service unit to which the terminal device in question is connected when the terminal device receives the notification of transmission of the large volume of data from the server.

According to the second aspect of the invention, a server-client type system in which at least one terminal device on a client side is connected to a server through an ISDN network and corresponding one or at least two digital service units, wherein the server comprises notification means for notifying, when a large volume of data to be transmitted whose volume is not less than a predetermined value is generated, to the terminal device as a transmission destination to the effect that the large volume of data is to be transmitted together with a necessary data transmission time by the D-channel packet exchange, and transmission means for, after the reception of a data transmission allowance signal from the terminal device, starting transmission of the large volume of data using a B-channel to cause the terminal device to download the large volume of data, and the terminal device comprises announcement means for, upon receiving the notification of transmission of the large volume of data with the data transmission time applied from the server, announcing the data transmission time to authorize a user to determine allowance/non-allowance of transmission, and transmission allowance notifying means for notifying the transmission allowance signal by the D-channel packet exchange through operation of the user based on the announcement of the announcement means.

According to the present invention, since when a terminal device receives a notification of transmission of a large volume of data from a server, a user determines whether the transmission of the large volume of data from the server is allowed or not, no means is required for monitoring a state of use of Bch lines, which makes downloading at timing according to user's intention possible.

According to the third aspect of the invention, a data downloading method in a server-client type system for transmitting data generated at a server to a terminal device on an arbitrary client side for downloading through an ISDN network and a digital service unit, comprising the steps of the step, by the server, of notifying, when a large volume of data to be transmitted whose volume is not less than a predetermined value is generated, to the terminal device as a transmission destination to the effect that the large volume of data is to be transmitted by the D-channel packet exchange, the step, by the terminal device receiving the notification of transmission of the large volume of data, of monitoring a state of a free B-channel line of all ISDN communication devices connected to the digital service unit to which the terminal device in question is connected, and notifying the server of a data transmission timing signal by the D-channel packet exchange at timing not preventing use of a B-channel line, and the step, by the server, of, after receiving the data transmission timing signal, starting transmission of the large volume of data using the B-channel to cause the terminal device to download the large volume of data.

According to the present invention, since a data transmission timing signal is notified to a server at timing not preventing use of Bch lines at a terminal device, and when receiving the data transmission timing signal, the server transmits data to the terminal device for downloading, downloading taking line use by a user into consideration first of all can be done.

In the preferred construction, the terminal device, upon receiving the notification of transmission of the large volume of data from the server, determines whether the reception time is within a B-channel use-allowed time zone or not and when within the B-channel use-allowed time zone, immediately transmits the data transmission timing signal to the server and when not within the B-channel use-allowed time zone, monitors a state of free B-channel lines.

In another preferred construction, the terminal device if the time when the notification of transmission of the large volume of data is received from the server is within a B-channel use-allowed time zone, upon a lapse of a first predetermined time with the B-channels in all the ISDN communication devices connected to the digital service unit to which the terminal device in question is connected being all free, notifies the server of a transmission allowance to cause the server to transmit the large volume of data, and if the time when the notification of transmission of the large volume of data is received from the server is not within the B-channel use-allowed time zone and at that time, a part of the B-channels in all the ISDN communication devices connected to the digital service unit to which the terminal device in question is connected are free, notifies the server of a transmission non-allowance to cause the server receiving the transmission non-allowance to again notify the terminal device to the effect that the large volume of data is to be transmitted by the D-channel packet exchange upon a lapse of a second predetermined time.

In another preferred construction, the terminal device conducts calling to the server for downloading in place of the transmission allowance notification.

In another preferred construction, the terminal device conducts calling to the server for downloading, if there is at least one free B-channel line among all the ISDN communication devices connected to the digital service unit to which the terminal device in question is connected when the terminal device receives the notification of transmission of the large volume of data from the server.

According to another aspect of the invention, a data downloading method in a server-client type system for transmitting data generated at a server to a terminal device on an arbitrary client side for downloading through an ISDN network and a digital service unit, comprising the steps of the step, by the server, of notifying, when a large volume of data to be transmitted whose volume is not less than a predetermined value is generated, to the terminal device as a transmission destination to the effect that the large volume of data is to be transmitted together with a data transmission time by the D-channel packet exchange, the step, by the terminal device receiving the notification, of announcing the data transmission time to authorize a user to determine allowance/non-allowance of transmission and notifying the transmission allowance signal by the D-channel packet exchange through operation of the user based on the announcement, and the step, by the server, of, after receiving the data transmission allowance signal, starting the transmission of the large volume of data using the B-channel to cause the terminal device to download the large volume of data.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
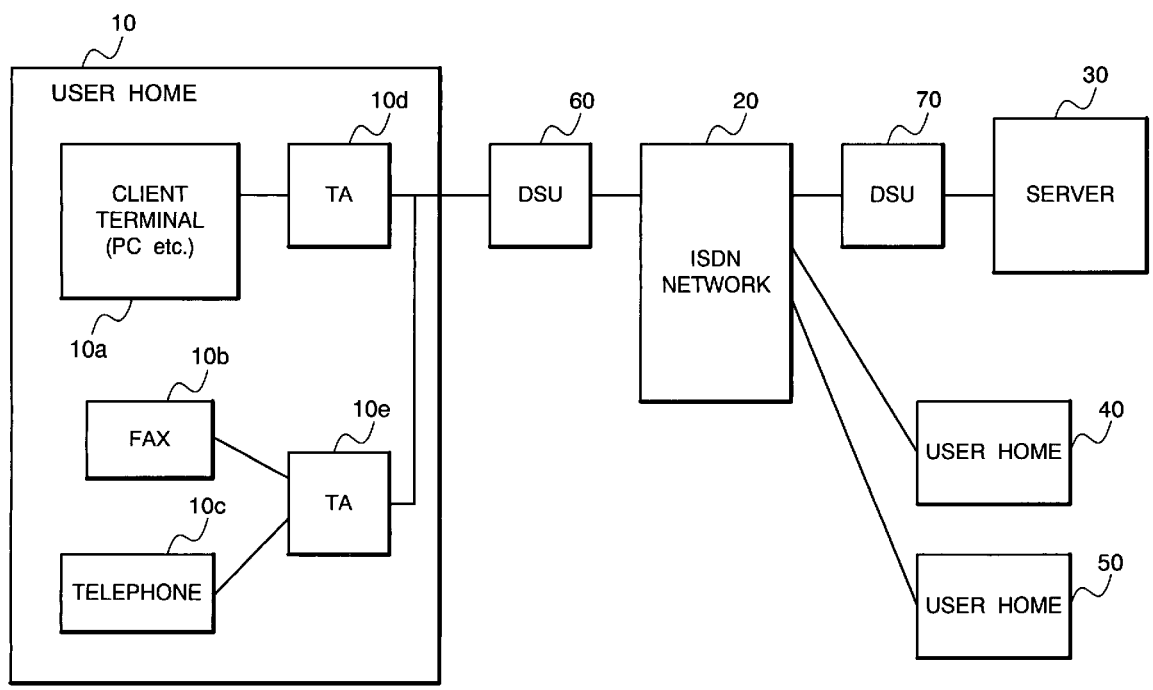
FIG. 1 is a block diagram showing a server-client type system using an ISDN line according to one embodiment of the present invention.

FIG. 1 is a block diagram showing a server-client type system according to one embodiment of the present invention. In present embodiment, a user home 10 is connected to a server 30 through a digital service unit (DSU) 60, an ISDN network 20 and a DSU 70. Also to the ISDN network 20, user homes 40 and 50 are connected whose structure is similar to that of the user home 10.

The user home 10 is composed of a client terminal 10a such as a PC, a FAX 10b, a telephone 10c, and TAs 10d and 10e. The client terminal 10a is connected to the DSU 60 through the TA 10d, and the FAX 10b and the telephone 10c are connected to the DSU 60 through the TA 10e. The client terminal 10a such as a PC, the FAX 10b and the telephone 10c may be devices mounted with a packet assembly and disassembly function (hereinafter referred to as PAD function) or may not. In a case where a device not mounted with the PAD function is to be connected to an ISDN line, connection is enabled through a TA having the PAD function. In addition, these devices (PC, FAX, telephone etc.) may be mounted with the DSU function. FIG. 1 shows an example of the client terminal 10a such as PC, the FAX 10b and the telephone 10c having none of DSU and PAD functions.

Figure 2:
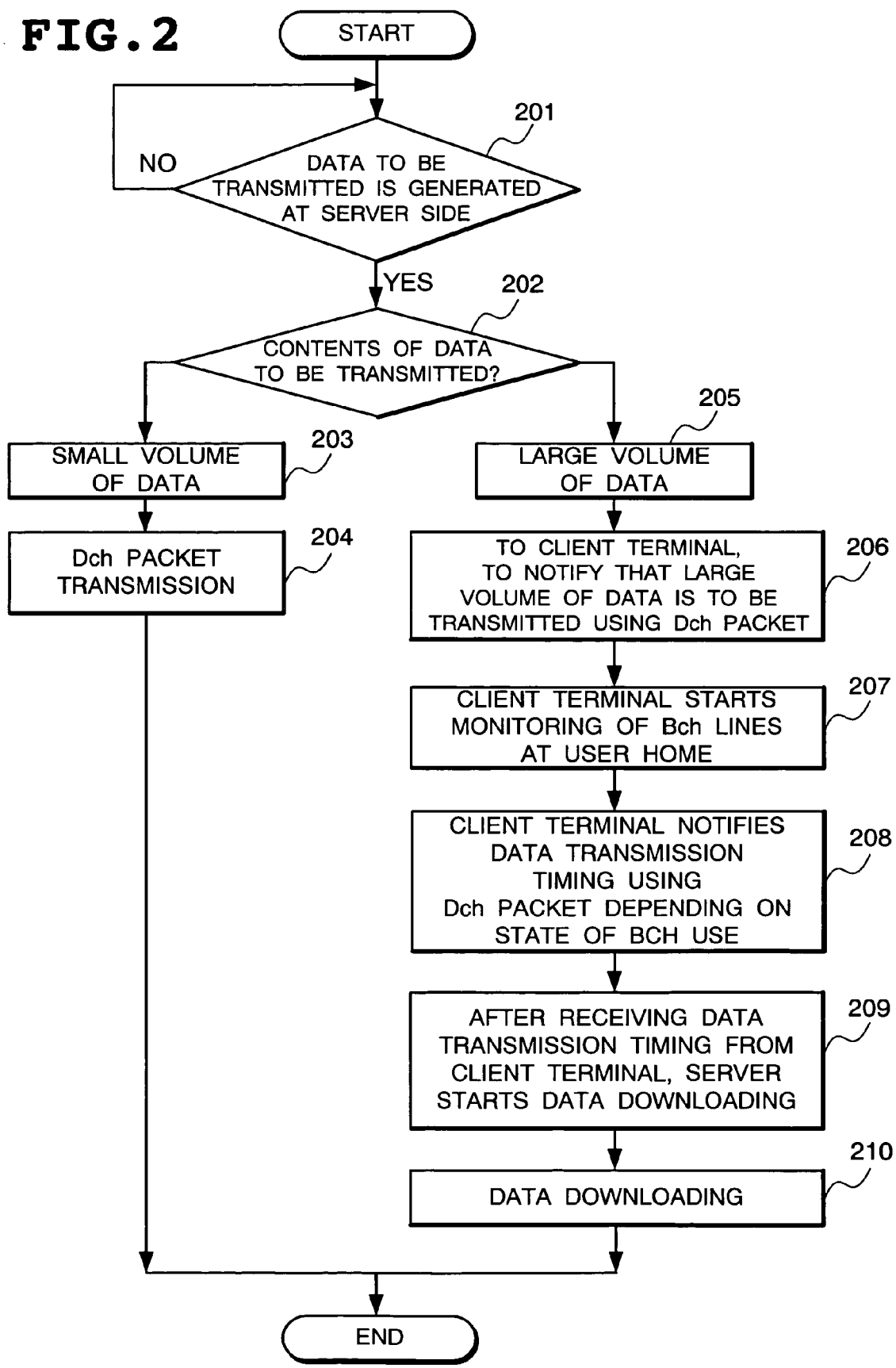
FIG. 2 is a flow chart of a data downloading method according to one embodiment of the present invention.

Although the foregoing block structure itself is the same as that of a conventional system, the present embodiment is characterized in that the server 30 transmits a large volume of data to the client terminal 10a according to the flow chart of FIG. 2. More specifically, in the communication between the client terminal 10a and the server 30, when data to be transmitted is generated at the server 30 (Step 201 of FIG. 2), determination is made whether the contents of the data to be transmitted is of a small volume (not more than several k bytes) or a large volume (Step 202 of FIG. 2) and when it is a small volume of data (Step 203 of FIG. 2), the server 30 conducts calling and transmission using the Dch packet exchange (Step 204 of FIG. 2). In this case, irrespectively of a line state of a transmission destination, that is, even when both of the two Bch lines are used and there remains no free line, data transmission and reception is possible.

On the other hand, when the data to be transmitted is of a large volume (several M bytes) (Step 205 of FIG. 2), the server 30 first notifies to the client terminal 10a as a transmission destination by the Dch packet exchange to the effect that a large volume of data is to be transmitted (Step 206 of FIG. 2). Upon receiving the notification, the client terminal 10a starts monitoring a Bch line state at the user home 10 (Step 207 of FIG. 2). By monitoring the state of a free Bch line at the user home 10, the client terminal 10a calls and notifies, to the server 30 which intends to send a large volume of data by the Dch packet exchange, a data transmission timing signal whose timing will not prevent Bch line use (Step 208 of FIG. 2).

During the time from Step 207 to Step 208, the server 30 is at a state of waiting a transmission allowance from the client terminal 10*a*. After receiving a data transmission allowance timing signal from the client terminal 10*a*, the server 30 starts data downloading (Steps 209 and 210 of FIG. 2), which enables downloading of a large volume of data that will not prevent Bch use at the user home 10.

Figure 3:
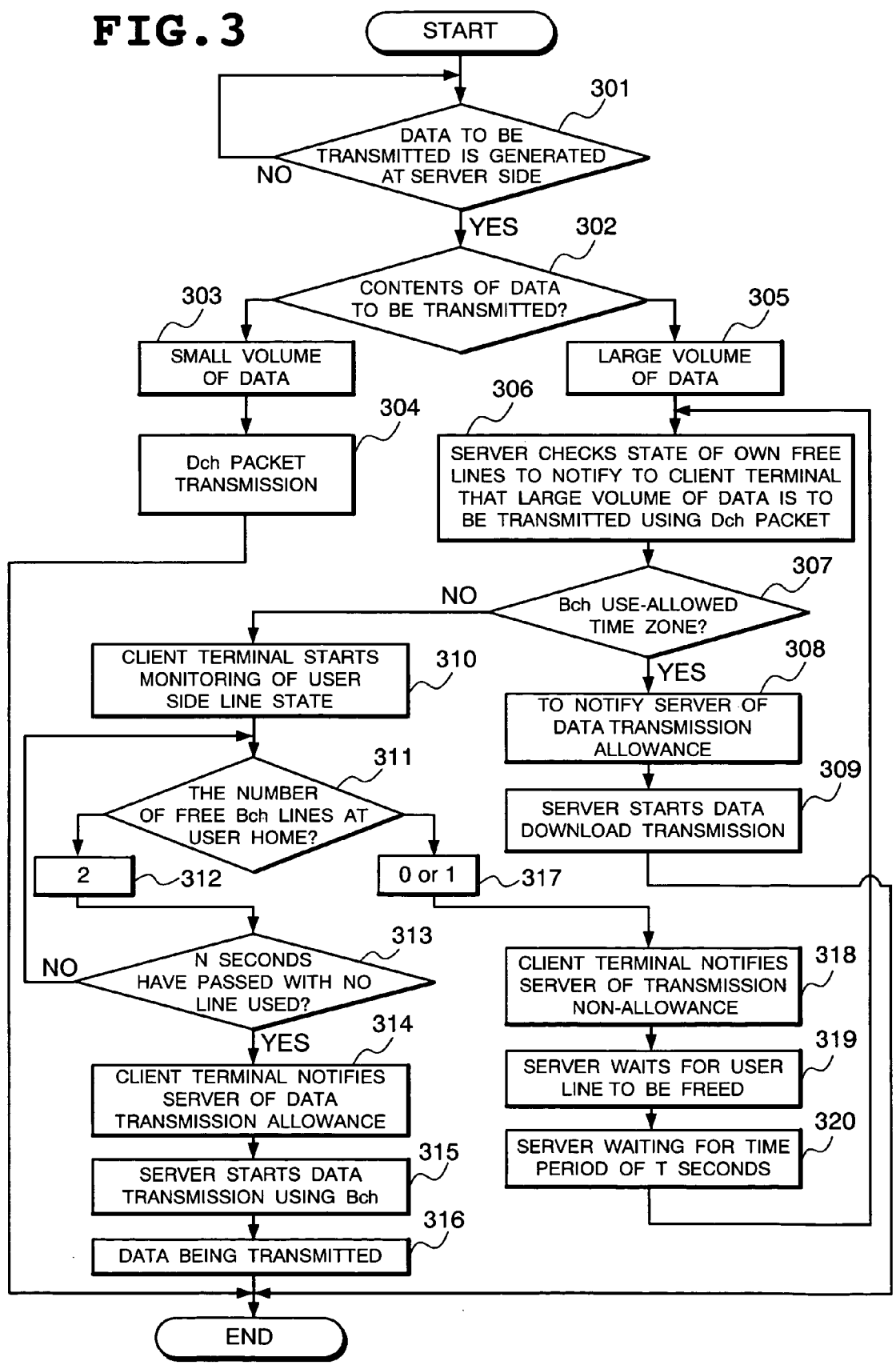
FIG. 3 is a flow chart of the data downloading method according to a first embodiment of the present invention.
Figure 4:
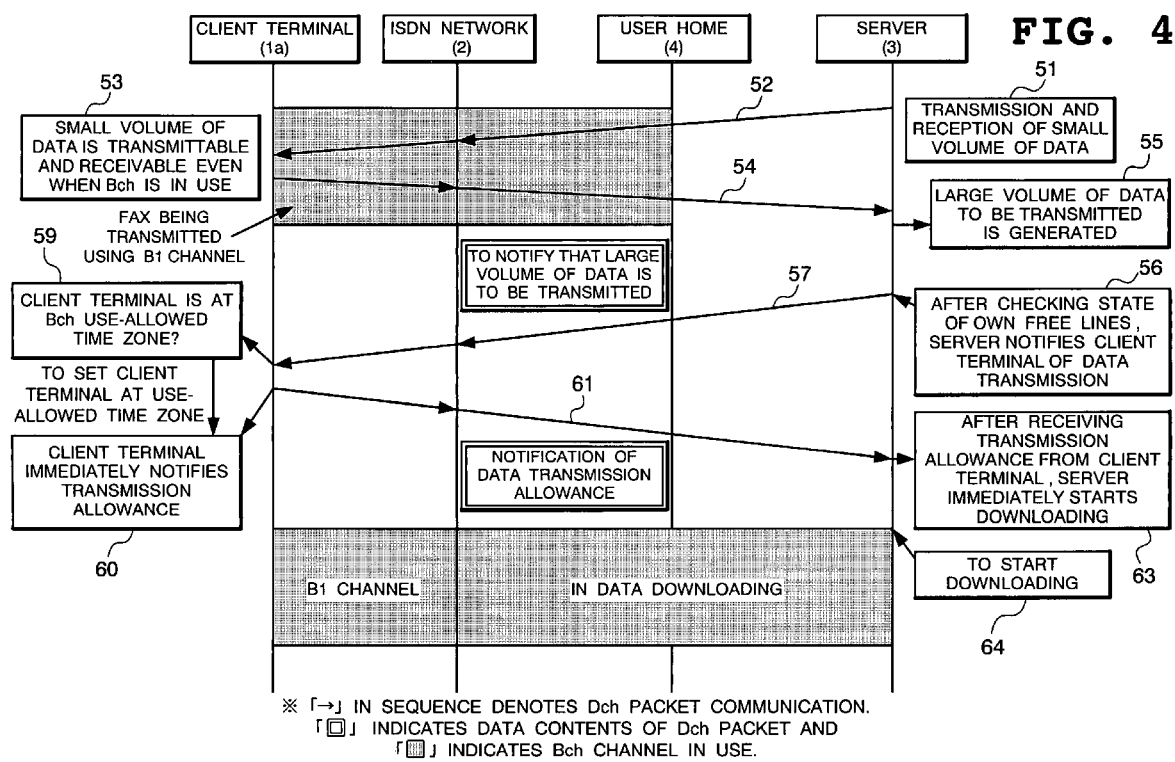
FIG. 4 is a sequence diagram showing a state where a client terminal receiving a notification of transmission of a large volume of data is at a time zone allowed to use Bch in FIG. 3.
Figure 5:
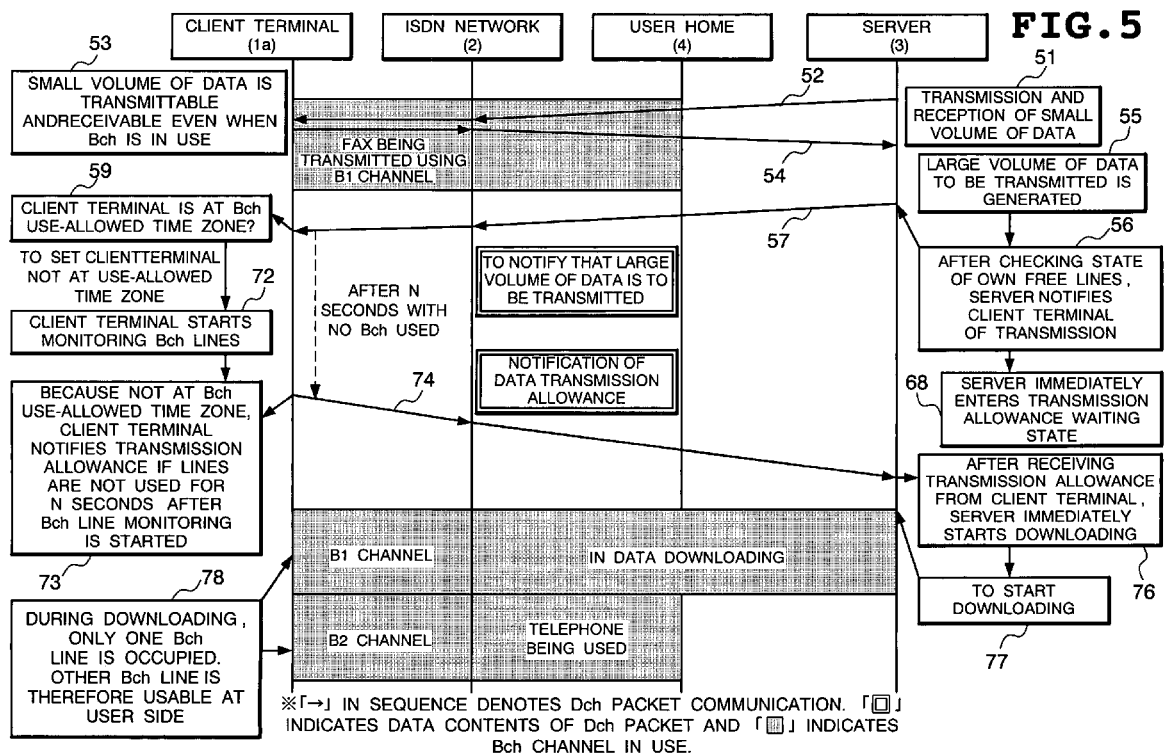
FIG. 5 is a sequence diagram showing a state where the client terminal receiving a notification of transmission of a large volume of data is not at a time zone allowed to use Bch in FIG. 3.
Figure 6:
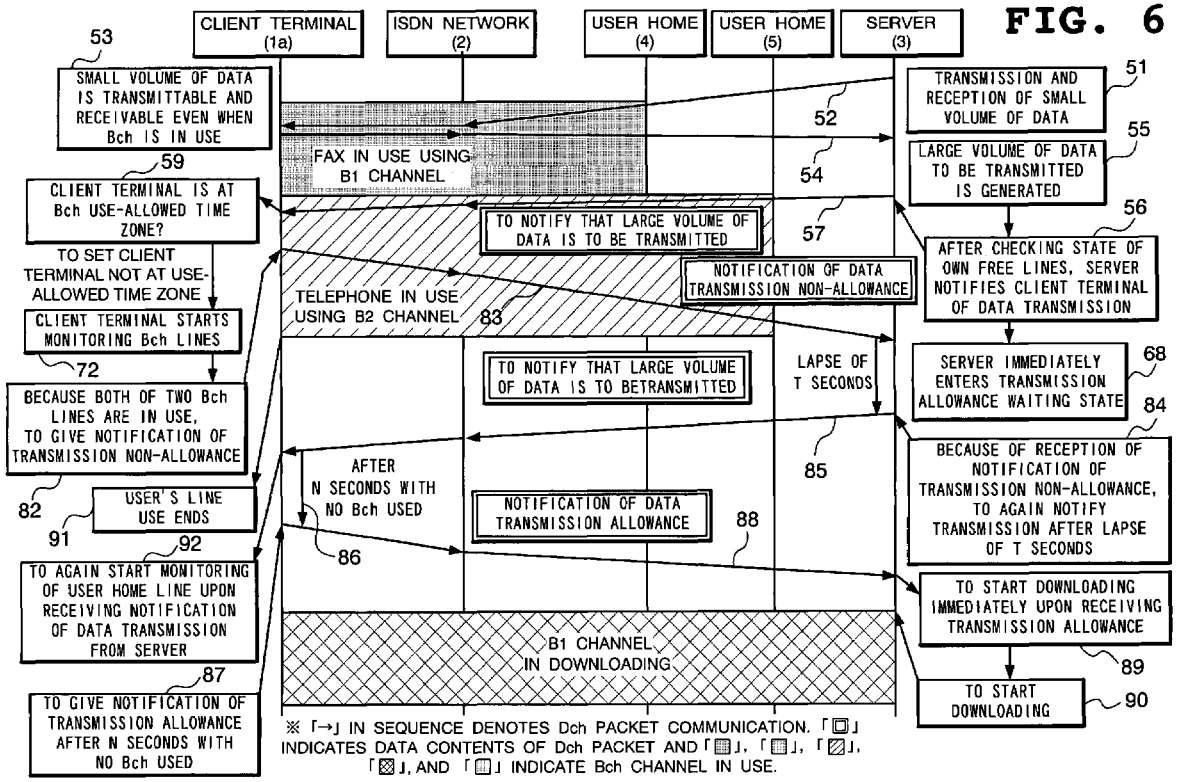
FIG. 6 is a sequence diagram showing a state where the client terminal receiving a notification of transmission of a large volume of data is not at a time zone allowed to use Bch in FIG. 3.

Next, description will be made of a data downloading method according to each embodiment of the present invention. FIG. 3 is a flow chart of a data downloading method according to a first embodiment of the present invention, FIG. 4 is a sequence diagram showing a state where a client terminal receiving a notification of transmission of a large volume of data is at a time zone allowed to use Bch in FIG. 3, FIGS. 5 and 6 are sequence diagrams showing a state where the client terminal is not at a time zone allowed to use Bch. In FIGS. 3 to 6, the same components as those in FIG. 1 are allotted the same reference numerals.

In the communication between the client terminal 10*a* and the server 30, when data to be transmitted is generated at the server 30 (Step 301 of FIG. 3, Step 51 of FIG. 4), determination is made whether the contents of the data to be transmitted is of a small volume (not more than several k bytes) or a large volume (Step 302 of FIG. 3) and when it is a small volume of data (Step 303 of FIG. 3), the server 30 conducts calling and transmission using the Dch packet exchange (Step 304 of FIG. 3, Step 52 of FIG. 4).

As to transmission and reception of a small volume of data, use of Dch packet exchange having a disadvantage in transmission time and charges enables data transmission and reception irrespectively of a state of a Bch line use at the client terminal 10*a* side, that is, even if both of the two Bch lines are used to leave no free line (Step 53 of FIG. 4). In the sequence diagram of FIG. 4, even during FAX transmission from the user home 10 using the B1 channel, for example, transmission or reception of a small volume of data is possible.

On the other hand, when the data to be transmitted is of a large volume (several M bytes), the server 30 first notifies by calling to the client terminal 10*a* as a transmission destination by the Dch packet exchange to the effect that a large volume of data is to be transmitted while ensuring its own line (Steps 305 and 306 of FIG. 3, Steps 55, 56 and 57 of FIG. 4). Upon receiving the notification, the client terminal 10*a* determines whether it is at a Bch use-allowed time zone (Step 307 of FIG. 3 and Step 59 of FIG. 4). Here, the Bch use-allowed time zone is a time period preset at the client terminal 10*a*. The communication sequence diagram of FIG. 4 shows processing conducted within the Bch use-allowed time zone.

More specifically, since the time when the notification of transmission of a large volume of data is received is within the use-allowed time zone, the client terminal 10*a* notifies the server 30 of a transmission allowance unconditionally by the Dch packet exchange (Step 308 of FIG. 3, Steps 60 and 61 of FIG. 4). The server 30 at the state of waiting for a transmission allowance from the client terminal 10*a* starts data download transmission by the Bch line exchange upon receiving the notification (Step 309 of FIG. 3, Steps 63 and 64 of FIG. 4).

On the other hand, when the client terminal 10*a* receives the notification of transmission of a large volume of data, if it is not at the Bch use-allowed time zone, it starts monitoring a state of the Bch lines at the user home 10 (Step 310 of FIG. 3, Step 72 of FIG. 5).

At this time, if the number of free Bch lines at the user home 10 is two, the client terminal 10*a* notifies the server 30 of a transmission allowance by the Dch packet exchange upon a lapse of N seconds with none of the two lines used (Steps 311 to 314 of FIG. 3, Steps 73 and 74 of FIG. 5), assuming that the N seconds of no line use time is set at the client terminal 10*a* in advance.

After giving the notification of transmission of a large volume of data, the server 30 remains at the state of waiting for a transmission allowance from the client terminal 10*a* (Step 68 of FIG. 5) and upon receiving a notification of a data transmission allowance from the client terminal 10*a*, immediately starts data download transmission by the Bch line exchange (Steps 315 and 316 of FIG. 3, Steps 76 and 77 of FIG. 5). During the downloading, only one line of the Bch lines is occupied and the remaining one is usable at the user side, so that, for example, while downloading is conducted using the B1 channel, the telephone can be used using the B2 channel (Step 78 of FIG. 5).

In a case where when the notification of transmission of a large volume of data is received by the client terminal 10*a*, it is not at the Bch use-allowed time zone and the number of free Bch lines at the user home 10 is ten channels or zero channel (Step 317 of FIG. 3), the client terminal 10*a* gives a notification of transmission non-allowance to the server 30 (Step 318 of FIG. 3, Steps 82 and 83 of FIG. 6). After receiving the notification of the transmission non-allowance, upon a lapse of T seconds, the server 30 again notifies the client terminal 10*a* to the effect that a large volume of data is to be transmitted by the Dch packet exchange (Steps 319 and 320 of FIG. 3, Steps 84 and 85 of FIG. 6).

After receiving the notification, the client terminal 10*a* repeats the operation of Step 306 and the following steps as described above. More specifically, the client terminal 10*a* is first allowed to give a notification of a transmission allowance to the server 30 when both of the two Bch lines have not been used for N seconds (Steps 311, 312, 313 and 314 of FIG. 3, Steps 86, 87 and 88 of FIG. 6). The client terminal 10*a* having given the transmission allowance enters a download data reception waiting state. Immediately upon receiving the notification of the transmission allowance, the server 30 starts data download transmission by the Bch line exchange (Steps 315 and 316 of FIG. 3, Steps 89 and 90 of FIG. 6).

The example of FIG. 6 shows a case where after the client terminal 10*a* transmits a notification of a transmission non-allowance to the server 30 (Step 82), use of the B2 channel by a user ends (Step 91) and thereafter the client terminal 10*a* receives a notification of transmission of a large volume of data from the server 30 to again start monitoring of lines of the user home 10 (Step 92) and transmits a notification of transmission allowance to the server 30 upon a lapse of N seconds without the use of the Bch lines.

Next, the second embodiment of the present invention will be described. FIG. 3 shows a flow chart of main parts of a data downloading method according to the second embodiment of the present invention. The second embodiment is a modification of the first embodiment obtained by arranging such that regarding the step (Step 307) of changing the data transmission allowance notification manner in the flow chart of FIG. 3 depending on a Bch use-allowed time zone, at the time of receiving a notification from the server 30 by the client terminal 10*a* by means of the Dch packet exchange to the effect that a large volume of data is to be transmitted (Step 306), a transfer time of download data is at the same time notified through display indication or voices to enable a user himself or herself having received the notification to give data transmission allowance/non-allowance.

Figure 7:
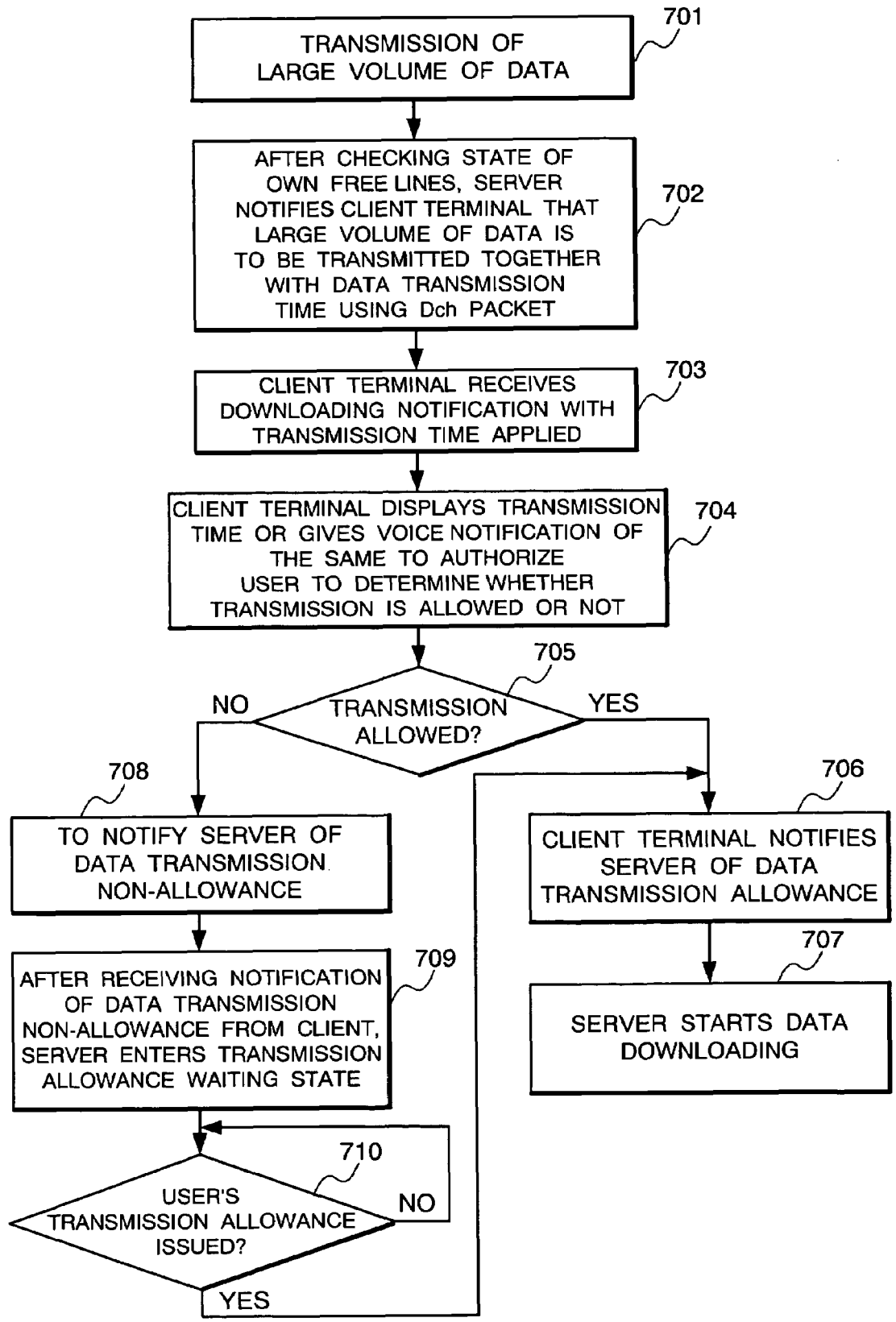
FIG. 7 is a flow chart of a main part of a data downloading method according to a second embodiment of the present invention.

In other words, the second embodiment is realized by replacing the processing at Step 305 and the following steps in FIG. 3 by the processing shown in the flow chart of FIG. 7. When a request for transmission of a large volume of data is generated, the server first notifies the client terminal by the Dch packet exchange to that effect with a data transmission time applied (Steps 701 and 702 of FIG. 7). Upon receiving the downloading notification, the client terminal displays the transmission time or gives a voice notification of the time to authorize the user to determine whether the transmission is allowed or not (Steps 703, 704 and 705 of FIG. 7). For example, output such an indication that "data transmission time=10 minutes, data transmission allowed=OK, data transmission not allowed=NG" on a display. Here, when the user allows data transmission, the client terminal notifies the server of the allowance through the Dch packet exchange network (Step 706 of FIG. 7) and upon receiving the notification, the server starts downloading (Step 707 of FIG. 7).

On the other hand, when the user does not allow data transmission at Step 705 of FIG. 7, the client terminal notifies the server to that effect through the Dch packet exchange network (Step 708 of FIG. 7) and after receiving the notification, the server enters a state of waiting for a transmission allowance from the client terminal (Step 709 of FIG. 7). Upon obtaining allowance of transmission by the user, the client terminal gives a transmission allowance notification to the server through the Dch packet exchange network (Steps 710 and 706 of FIG. 7). Upon receiving the transmission allowance notification, the server starts downloading (Step 707 of FIG. 7).

As described in the foregoing, in a case where timing at which a transmission allowance is notified is determined by a user as in the second embodiment, it will be unnecessary for the client terminal to monitor a free line state on the user side, making more efficient line use and sharing possible than those in the first embodiment.

Figure 8:
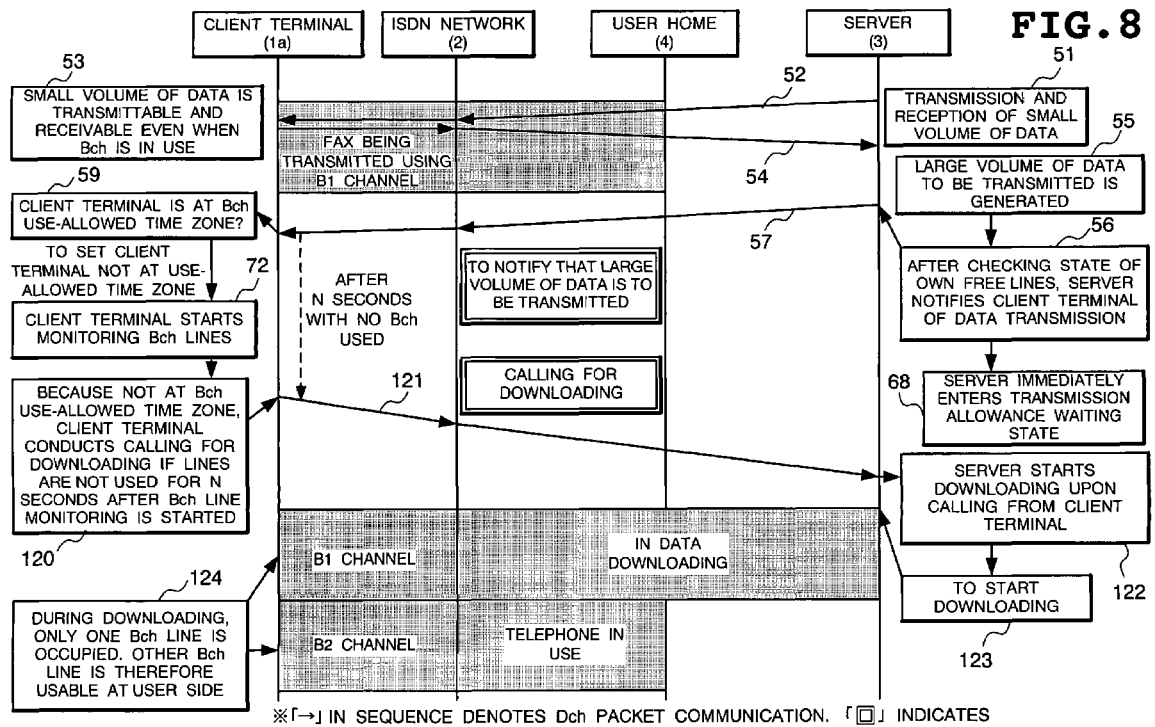
FIG. 8 is a sequence diagram of a data downloading method according to a third embodiment of the present invention.

Next, the third embodiment of the present invention will be described. FIG. 8 is a sequence diagram of a data downloading method according to the third embodiment of the present invention. In the figure, the same parts of the processing as those of FIG. 5 are allotted the same reference numerals. While in the above first embodiment, at the data downloading by the server, data transmission is all conducted upon calling from the server as shown in the flow chart of FIG. 3, in this third embodiment, the client terminal side conducts calling for data downloading after receiving a notification from the server to the effect that a large volume of data is to be transmitted.

More specifically, in FIG. 8, when the client terminal 10a receives a notification of transmission of a large volume of data from the server, the terminal starts monitoring the Bch line when it is not at the Bch use-allowed time zone and conducts calling for downloading when the line is not used for N seconds from the starting time point of monitoring (Steps 59, 72, 120 and 121 of FIG. 8). The server 30 starts downloading at the time of receiving the calling (Steps 122 and 123 of FIG. 8). In other words, in the present embodiment, calling from the client terminal 10a corresponds to a data transmission allowance to the server 30. Such processing eliminates the possibility that in a time period from the time when the client terminal 10a gives a notification of a transmission allowance to the time when the server 30 starts data downloading, download will not be enabled because of use of a line by the user.

During data downloading, of the user side lines, one Bch is in use for downloading, the other Bch line is free to allow use by the user (Step 124 of FIG. 8). In FIG. 8, during downloading using the B1 channel, communication with the user home 40 is made using a telephone by means of the B2 channel.

Figure 9:
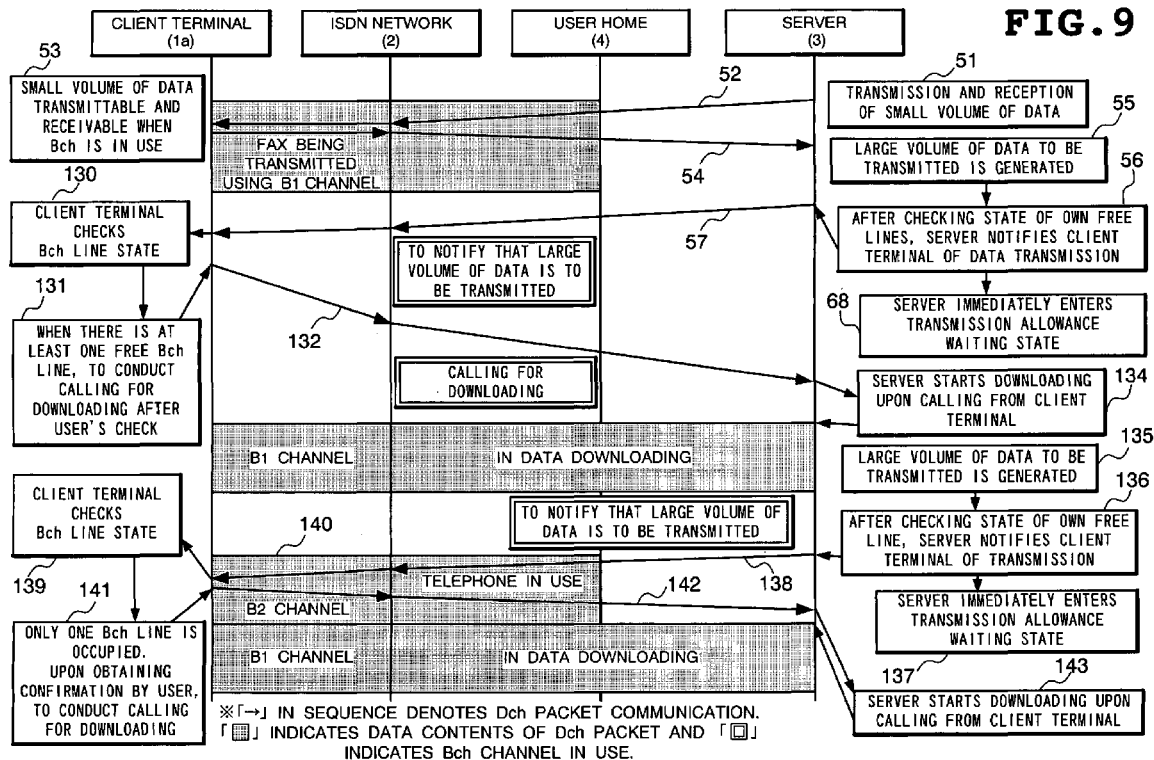
FIG. 9 is a sequence diagram of a data downloading method according to a fourth embodiment of the present invention.

Next, the fourth embodiment of the present invention will be described. FIG. 9 is a sequence diagram of a data downloading method according to the fourth embodiment of the present invention. In the figure, the same parts of the processing as those of FIG. 5 are allotted the same reference numerals. While in the above first embodiment, as shown in the flow chart of FIG. 3, the client terminal 10a unconditionally outputs a transmission allowance to the server 30 when it is within the Bch use-allowed time zone, and when it is not within the Bch use-allowed time zone, outputs a transmission allowance only when both of the two Bch lines are free, thereby preventing a user's line from entering a state of busy, in the present embodiment, after a confirmation made by the user, procedures are set.

More specifically, upon receiving a notification of transmission of a large volume of data, the client terminal 10a checks a Bch line state (Step 130 of FIG. 9) and when at least one Bch line is free, conducts calling for downloading after a confirmation made by the user (Steps 131 and 132 of FIG. 9). Upon receiving the calling, the server 30 starts transmission of data to be downloaded (Step 134 of FIG. 9).

After the data downloading is finished, when another large volume of data to be transmitted is generated, the server 30 again notifies the client terminal 10a to that effect (Steps 135, 136 and 138 of FIG. 9) to enter the transmission allowance waiting state (Step 137 of FIG. 9). Upon receiving the notification of transmission of a large volume of data, the client terminal 10a checks the Bch line state (Step 139 of FIG. 9). At this time point, although the user home 10 is using the telephone for conversation with the user home 40 by means of the B2 channel, the B1 channel is free, whereby the user confirms that only one Bch line is occupied to conduct calling for downloading (Steps 140, 141 and 142 of FIG. 9). Upon receiving the calling, the server 30 starts transmission of the data to be downloaded by using the B2 channel (Step 143 of FIG. 9). According to the fourth embodiment, the same effect as that of the first embodiment can be obtained.

As described in the foregoing, according to the present invention, since a data transmission timing signal is notified to the server by the D-channel packet exchange at timing not preventing use of a B-channel line at the terminal device and after the reception of the data transmission timing signal, the server first transmits data to the terminal device for downloading, downloading is enabled by the output of a timing signal from the terminal device taking a user's line use into consideration first of all, for example, by setting such a priority time zone for downloading as "Bch use-allowed time", thereby realizing efficient line use and sharing without preventing user's line use.

In addition, according to the present invention, since when the terminal device receives a notification of transmission of a large volume of data from the server, a user determines whether the transmission of a large volume of data from the server is allowed or not, downloading is possible at timing according to a user's intention without the need of a means for monitoring a state of use of B-channel lines, whereby more flexible and efficient line use and sharing is possible according to a user's intention.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A server-client system,
wherein a client terminal is connected to a server through an ISDN network;
wherein said server comprises
notification means for transmitting to said client terminal, via a D-channel, a notification that a large volume of data is to be transmitted, when data, whose volume is greater than a predetermined volume is generated,
transmission means for transmitting the large volume of data to said client terminal via a B-channel, upon reception of a notification of data transmission allowance from said client terminal and for entering into a transmission allowance waiting state during which the large volume of data is not transmitted to said client terminal upon reception of a notification of data transmission non-allowance from said client terminal; and
wherein said client terminal comprises
monitoring means for monitoring a state of all B-channel lines between said client terminal and said server, upon reception of the notification that a large volume of data is to be transmitted from said server;
a transmission allowance notification means for transmitting to said server, via a D-channel, the notification of data transmission allowance when two or more B-channel lines are free and for transmitting to said server, via a D-channel, the notification of data transmission non-allowance when two or more B-channel lines are not free.

2. The server-client system according to claim 1,
wherein said client terminal further comprises
determining means for determining, upon reception of the notification that a large volume of data is to be transmitted from said server, if the reception is within a B-channel use-allowed dime interval;
wherein said transmission allowance notification means only transmits a notification of data transmission allowance to said server if the reception is within the B-channel use-allowed time interval.

3. The server-client system according to claim 1, wherein, upon reception of the notification of data transmission non-allowance from said client terminal, said notification means of said server retransmits to said client terminal, via a D-channel, the notification that a large volume of data is to be transmitted, upon a lapse of a predetermined period of time.

4. The server-client system, according to claim 1, wherein instead of transmitting the notification of data transmission allowance, said transmission allowance notification means conducts calling to said server for downloading the large volume of data.

5. A server-client system,
wherein a client terminal is connected to a server through an ISDN network;
wherein said server comprises
notification means for transmitting to said client terminal, via a D-channel, data transmission time and a notification that a large volume of data is to be transmitted, when data, whose volume is greater than a predetermined volume is generated,
transmission means for transmitting the large volume of data to said client terminal via a B-channel, upon reception of a notification of data transmission allowance from said client terminal and for entering into a transmission allowance waiting state during which the large volume of data is not transmitted to said client terminal upon reception of a notification of data transmission non-allowance from said client terminal; and
wherein said client terminal comprises
announcing means for announcing the data transmission time to a user, upon reception of the data transmission time and the notification that a large volume of data is to be transmitted from said server;
authorization means for enabling a user to authorize the transmission of the large volume of data; and
a transmission allowance notification means for transmitting to said server, via a D-channel, the notification of data transmission allowance when the user authorizes the transmission of the large volume of and for transmitting to said server, via a D-channel, the notification of data transmission non-allowance when the user does not authorize the transmission of the large volume of data;
wherein said data transmission time is an amount of time which is required for a transmission of said large volume of data to said client terminal.

6. A data downloading method, comprising:
(a) generating data at a server to be transmitted to a client terminal;
(b) determining at the server whether the volume of data to be transmitted is larger than a predetermined volume;
(c) if the volume of data to be transmitted is not larger than a predetermined volume, transmitting the data from the server to the client terminal via a D channel;
(d) if the volume of data to be transmitted is larger than a predetermined amount, transmitting a notification from the server to the client terminal, that a large volume of data is to be transmitted;
(e) upon reception of the notification from the sever, monitoring the use of B channels at the client terminal;
(f) if two or more B channels are available, conducting calling from the client terminal to the server for downloading the large volume of data, instead of step (f);
(g) upon reception from the client terminal of notification of data transmission allowance, transmitting the large volume of data from the server to client via only one B channel; and
(h) if two or more B channels are not available, transmitting notification of data transmission non-allowance from the client terminal to the server.

7. A data downloading method, comprising:
(a) generating data at a server to be transmitted to a client terminal;

(b) determining at the server whether the volume of data to be transmitted is larger than a predetermined volume;
(c) if the volume of data to be transmitted is not larger than a predetermined volume, transmitting the data from the server to the client terminal via a D channel;
(d) if the volume of data to be transmitted is larger than a predetermined amount, transmitting from the server to the client terminal a data transmission time and a notification that a large volume of data is to be transmitted;
(e) upon reception of the data transmission time from the server, announcing the data transmission time to a user at the client terminal;
(f) if authorized by the user, transmitting a notification of data transmission allowance from the client terminal to the server;
(g) upon reception from the client terminal of notification of data transmission allowance, transmitting the large volume of data from the server to client via only one B channel; and
(h) if not authorized by the user, transmitting notification of data transmission non-allowance from the client terminal to the server;
wherein said data transmission time is an amount of time which is required for a transmission of said large volume of data to said client terminal.

* * * * *